Dec. 9, 1952 G. A. HULL 2,620,688
ADJUSTABLE LOCATING STOP FOR MACHINE TOOLS
Filed July 25, 1949

INVENTOR.
GEORGE A. HULL
BY
*Whittemore Hulbert & Belknap*
ATTORNEYS

Patented Dec. 9, 1952

2,620,688

UNITED STATES PATENT OFFICE 2,620,688

ADJUSTABLE LOCATING STOP FOR MACHINE TOOLS

George A. Hull, Detroit, Mich.

Application July 25, 1949, Serial No. 106,662

4 Claims. (Cl. 77—63)

The present invention relates to an adjustable locating stop for machine tools. The device is intended for use with machine tools such for example as drill presses, punch presses, riveting machines and the like in which the work piece being operated on is held manually by the operator.

Particularly in the case of a drill press accidents frequently happen when the torque imparted to the work resting on the table by the tool twists the work piece out of the operator's hand.

It is an object of the present invention to provide an adjustable locating stop adapted to be abutted against a side of the work piece and between a work piece and a substantial abutment on the machine tool, such for example as the column.

It is a further object of the present invention to provide an adjustable stop of the character described, comprising a clamp for securing the stop to the table of the machine and adjusting means to provide for bringing opposite sides of the stop into engagement with the column or other stationary part of the machine and a side of the work piece.

Other objects and features of the invention will become apparent as the description proceeds, especially when considered in conjunction with the accompanying drawings, wherein.

Figure 1:
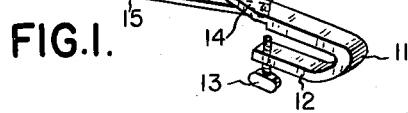
Figure 1 is a perspective view of the improved stop.
Figure 2:
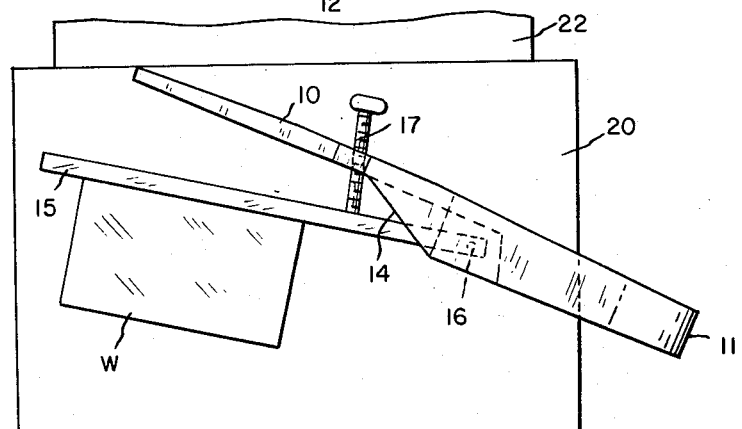
Figure 2 is a plan view showing the stop in operative relation on the table of a machine tool.
Figure 3:
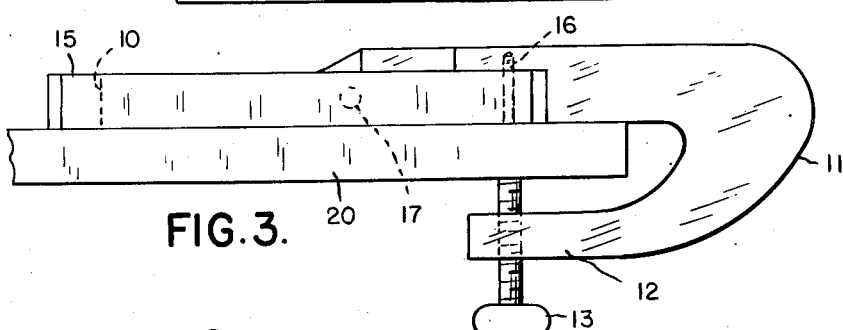
Figure 3 is a side elevation of the stop associated with a portion of the table.

Referring now to Figures 1–3 the adjustable stop comprises an arm 10 having one end reversely bent as indicated at 11 to provide a C-clamp 12 carrying an adjustable clamping element such as the screw 13. Obviously, any other type of clamp could be substituted, such for example as a toggle clamp if desired. Intermediate its ends the arm 10 has a laterally projecting flange portion 14 beneath which is pivoted a second arm 15, the pivot connection between the arms 10 and 15 being illustrated at 16.

In order to provide for relative movement between the arms 10 and 15 toward and away from each other, there is provided an adjustable bolt 17 which is threaded through one of the arms as for example the arm 10, and abuts the adjacent surface of the other arm 15, as best illustrated in Figure 2.

In use the stop is located on a table 20 of a machine tool, such for example as a drill press, and is clamped thereto by tightening the clamping bolt 13. The arm 10 is placed against a stationary abutment 22 on the machine tool which may be the upwardly extending column of the machine carrying the tool. Alternatively of course, the arm 10 may be abutted against any stationary abutment provided on or adjacent the table 20.

With the arm 10 against the stationary abutment 22, the arm 15 is adjusted outwardly by the bolt 17 until it engages one side of a work piece W. At this time the tool is brought into conjunction with the work pieces which may be held with the hand without risk, since the abutment provided by the arm 15 will prevent the torque of the tool from rotating the work piece W.

Figure 4:
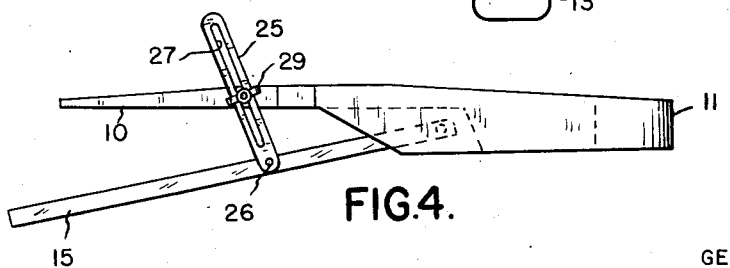
Figure 4 is a plan view of a modified form of stop.

In Figure 4 there is illustrated a second embodiment of the invention which differs from the first only in that the means for effecting adjustment between the arms 10 and 15 is in this instance comprised by a link 25 pivoted as indicated at 26 to one of the arms and having an elongated slot 27 receiving a suitable clamping element such for example as a wing nut 29. The operation of the embodiment of the stop illustrated in Figure 4 is identical with that illustrated in the preceding figures except that adjustment between the arms 10 and 15 is of course much more rapid.

Figures 5, 6:
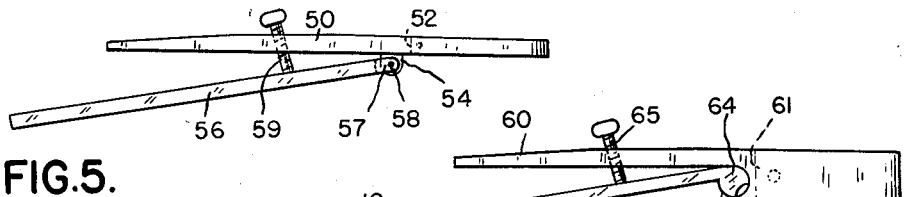
Figures 5 and 6 are plan views of somewhat modified forms of the invention.

Referring now to Figure 5 the device comprises a body 50 having a reversely bent U-shaped portion 52 for clamping the device to the table. Projecting laterally from the body 50 is an apertured ear 54. The arm 56 has a bifurcated end as indicated at 57 which is pivotally connected to the ear 54 by the pivot pin 58. Clamping means for retaining the arm 56 in predetermined spaced relation to the body 50 is indicated at 59.

Referring now to Figure 6 the main body is indicated at 60 and comprises a reversely bent U-shaped portion 61 at the end serving as a clamp for securing the device to the table. In this case the body 60 has a gored opening 62 of circular cross section and comprising substantially more than 180 degrees of arc. The adjustable arm 63 has an end portion 64 of cylindrical shape received within the gored opening 62 to provide for pivotal movement of the arm 63 relative to the body 60. The means for retaining the arm 63 in predetermined spaced relation from the body 60 is indicated in this case by the adjusting bolt 65.

While the several embodiments of the invention all illustrate the arm as pivoted to the body for adjustment toward and away therefrom, it will be obvious that the two parts may be slidably related if desired, although the pivoted arrangement is preferred.

The drawings and the foregoing specification constitute a description of the improved adjustable locating stop for machine tools in such full, clear, concise and exact terms as to enable any person skilled in the art to practice the invention, the scope of which is indicated by the appended claims.

What I claim as my invention is:

1. An adjustable locating stop device for a drill press or the like having a table and a rigid, fixed abutment extending above the plane of the table, said stop device comprising a C-clamp for attachment to the table in any desired position of adjustment, said C-clamp having an arm adapted to overlie and rest upon the table and to engage the side of the abutment, a second arm, a pivot securing said second arm to said first arm for swinging movement over the table, and adjusting means between said arms for swinging the second arm away from said first arm and locking said second arm in adjusted position, said stop device being thus interposed between the fixed abutment and a work piece located anywhere on the table.

2. A device as defined in claim 1, in which said adjusting means is a screw threaded through one of said arms and engaging the other of said arms.

3. A device as defined in claim 1, said first arm having a shoulder projecting laterally therefrom, and a hole of circular cross section extending through said shoulder from top to bottom thereof and intersecting a side of said shoulder adjacent to said first arm to leave a lateral slot leading into said hole and comprising substantially less than 180° of the circumference of said hole, said second arm having an enlarged head of circular cross section fitting into said hole, said second arm being pivoted thereby to said first arm and swingable relative thereto.

4. A device as defined in claim 3, in which one side of said first arm is tangent to said hole, and in which the side of said second arm adjacent said first arm is tangent to said enlarged head, whereby said arms are disposed in parallel abutting relation in the closed position thereof.

GEORGE A. HULL.

REFERENCES CITED

The following references are of record in the file of this patent:

UNITED STATES PATENTS

| Number | Name | Date |
| --- | --- | --- |
| 402,096 | Morgan | Apr. 23, 1889 |
| 1,267,447 | Phelan | May 28, 1918 |
| 2,276,819 | Boehmer | Mar. 17, 1942 |
| 2,285,897 | Campbell | June 9, 1942 |
| 2,458,188 | Moran | Jan. 4, 1949 |

OTHER REFERENCES

Disston Saw, Tool and File Manual, page 25, April 1942; Henry Disston & Sons, Inc., Philadelphia, Pa.